United States Patent
Hacigumus

(10) Patent No.: US 12,131,340 B2
(45) Date of Patent: *Oct. 29, 2024

(54) OPTIMAL GROUP OF SERVICE COMPOSITIONS

(75) Inventor: Vahit Hakan Hacigumus, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1963 days.

This patent is subject to a terminal disclaimer.

(21) Appl. No.: 12/060,951

(22) Filed: Apr. 2, 2008

(65) Prior Publication Data

US 2008/0195441 A1 Aug. 14, 2008

Related U.S. Application Data

(63) Continuation of application No. 11/427,115, filed on Jun. 28, 2006.

(51) Int. Cl.
*G06Q 30/02* (2023.01)
*G06Q 10/063* (2023.01)
*G06Q 10/0637* (2023.01)

(52) U.S. Cl.
CPC ........... *G06Q 30/02* (2013.01); *G06Q 10/063* (2013.01); *G06Q 10/06375* (2013.01)

(58) Field of Classification Search
None
See application file for complete search history.

(56) References Cited

U.S. PATENT DOCUMENTS 5,671,403 A 9/1997 Shekita et al.
5,841,958 A * 11/1998 Buss et al.
(Continued)

FOREIGN PATENT DOCUMENTS

WO WO-0171603 A2 * 9/2001 ............. G06Q 10/08

OTHER PUBLICATIONS

Jaeger, Michael C.; Muhl, Gero.; Golze, Sebastian. "QoS-aware Composition of Web Services: A Look at Selection Algorithms". 2005. Proceedings of the IEEE International Conference on Web Service (ICWS'05).*

(Continued)

*Primary Examiner* — Susanna M. Diaz
(74) *Attorney, Agent, or Firm* — Schmeiser, Olsen & Watts, LLP; Joseph P. Curcuru

(57) ABSTRACT

A method and system for forming service compositions to provide service components to business processes. Service components independently needed by each business process are identified. At least one of the service components is needed by at least two business processes. At least two different service components are needed by at least one business process. At least two service compositions are specified. Each service composition includes at least one service component. At least one service composition comprises at least two service components. An optimal subset of the service compositions is ascertained, such that the total cost of deploying the service compositions in the optimal subset to provide the service components independently needed by each business process does not exceed the total cost of deploying the service compositions in any other subset of the service compositions to provide the service components independently needed by each business process.

3 Claims, 8 Drawing Sheets

(56) References Cited

U.S. PATENT DOCUMENTS

| | | | |
|---|---|---|---|
| 6,341,266 B1* | 1/2002 | Braun | |
| 6,631,411 B1* | 10/2003 | Welter | H04L 67/22 709/224 |
| 6,968,324 B1* | 11/2005 | Ruffin et al. | |
| 7,072,807 B2* | 7/2006 | Brown et al. | |
| 7,162,509 B2* | 1/2007 | Brown et al. | |
| 7,185,342 B1* | 2/2007 | Carrer et al. | |
| 7,353,212 B1* | 4/2008 | Darcy et al. | |
| 2002/0049792 A1 | 4/2002 | Wilcox et al. | |
| 2002/0107775 A1 | 8/2002 | Hawkins | |
| 2003/0191677 A1 | 10/2003 | Akkiraju et al. | |
| 2004/0177335 A1 | 9/2004 | Beisiegel et al. | |
| 2005/0273341 A1* | 12/2005 | Hoffesommer | |
| 2006/0173987 A1* | 8/2006 | Friesen | H04L 67/16 709/223 |
| 2006/0282429 A1* | 12/2006 | Hernandez-Sherrington et al. | |
| 2007/0083502 A1* | 4/2007 | Ramakrishnan | |
| 2007/0192280 A1* | 8/2007 | Agrawal et al. | |

OTHER PUBLICATIONS

El-Darzi, Elia; Mitra, Gauam. "Graph Theoretic Relaxations of Set Covering and Set Partitioning Problems". 1995. European Journal of Operational Research. vol. 87.*

Jin, Li-jie.; Machiraju, Vijay.; Sahai, Akhil. "Analysis on Service Level Agreement of Web Services". Jue 21, 2002. Hewlett-Packard Company.*

Wang, Jun; Xiao, Jitian; Lam, Chiou Peng; Li, Huaizhong. "A Bipartite Graph Approach to Generate Optimal Test Sequences for Protocol Conformance Testing Using the Wp-method". 2005. Proceedings of the 12th Asia-Pacific Software Engineering Conference (APSEC'05).*

Chen, Minder.; Meixell, Mary J.; "Web Services Enabled Procurement in the Extended Enterprise: An Architectural Design and Implementation". 2003. Journal of Electronic Commerce Research. vol. 4, Issue 4.*

Chuah, Chen-Nee.; Subramanian, Lakshminarayanan.; Katz, Randy H.; Joseph, Anthony D. "Qos Provisioning Using A Clearing House Architecture". Jun. 2000. Proceedings of International Workshop on Quality of Service.*

Canfora, Gerardo; Di Penta, Massimiliano. "A Lightweight Approach for QoS-Aware Service Composition". 2004. In. Proc. 2nd International Conference on Service Oriented Computing (ICSOC'04).*

Wilson, Carol. "SBC, AT&T Make Big Promises". Jan. 31, 2005. Connected Planet Online.*

"The Basics of Mergers and Acquisitions". Investopedia.com. archived Jun. 3, 2004. retrieved from <http://www.investopedia.com/university/mergers/mergers1.asp>.*

Pareo, Vittorio. "Realizing Value From Acquisitions". August/Sep. 1995. The Electricity Journal.*

Clay, Thomas S.; "What Every Partner Should Know About the Costs of Merger". Feb. 2001. Report to Legal Management. vol. 28, No. 5.*

Larsson, Rikard; Finkelstein, Sydney. "Integrating Strategic, Organizational, and Human Resource Perspectives on Mergers and Acquisitions: A Case Survey of Synergy Realization". Jan.-Feb. 1999. Organization Science. vol. 10, No. 1. pp 1-26.*

Holtstrom, Johan; Anderson, Helen.; "Connected Synergy: New Perspectives on Synergy in M&A Research". Aug. 15-17, 2003. 13th Nordic Workshop on Interorganizational Research.*

Loomer, Suzanne; Harington, Andrew. "Sharing Synergies". May 2003. CA Magazine. vol. 136, No. 4.*

Loomer, Suzanne; Harington, Andrew. "Sharing Synergies". Archived Feb. 10, 2006. Retrieved from <http>//coleandpartners.com/pdf/Sharing_Monograph.pdf>.*

Fulghieri, Paolo; Hodrick, Laurie Simon. "Synergies and Internal Agency Conflicts: The Double-Edged Sword of Mergers". Jan. 2004.*

Weber, Yaakov; Pliskin, Nava. "The Effects of Information Systems Integration and Organizational Culture on a Firm's Effectiveness". 1996. Information & Management. vol. 30. pp 81-90.*

Amini et al.; Effective Peering for Multi-provider Content Delivery Services; Infocom 2004; Twenty-third Annual Joint Conference of the IEEE Computer and Communications Societies; vol. 2; Mar. 7-11, 2004; pp. 850-861.

Tang et al.; Adaptive Workflow-Oriented Services Composition and Allocation in Distributed Environment; Machine Learning and Cybernetic, 2004; Proceedings of 2004 International Conference on vol. 1; Aug. 26-29, 2004; pp. 559-603.

Gerede et al.; Online and Minimum-Cost Ad Hoc Delegation in e-Service Composition; Services Computing; 2005 IEEE International Conference on vol. 1; Jul. 11-15, 2004; pp. 103-110.

Van Le et al.; A Service Component-based Accounting and Charging Architecture to Support Interim Mechanisms Across Multiple Domains; Network Operations and Management Symposium, 2004; NOMS 2004; IEEE/IFIP vol. 1; Apr. 19-23, 2004; pp. 555-568.

Gu et al.; A Scalable QoS-Aware Service Aggregation Model for Peer-to-Peer Computing Grids; High Performance Distributed Computing, 2002; HPDC-11 2002. Proceedings. 11th IEEE International Symposium on Jul. 23-26, 2002; pp. 73-82.

Su et al.; Architecture and Performance of Application Networking in Pervasive Content Delivery; Data Engineering, 2005. ICDE 2005. Proceedings. 21st International Conference on Apr. 5-8, 2005; pp. 656-667.

Tsai et al.; Distributed Policy Specification and Enforcement in Service-Oriented Business Systems; e-Business Engineering, 2005; ICEBE 2005; IEEE International Conference on Oct. 12-18, 2005; pp. 10-17. (This NPL had previously been cited when Application was filed, but the NPL had not been submitted to the USPTO).

TechTarget Contributer, retrieved on Apr. 6, 2022 from the Internet: <URL: https://whatis.techtarget.com/definition/processor>, 3 pages.

Install Definition & Meaning / Dictionary.com, retrieved on Apr. 6, 2022 from the Internet: <URL: https://www.dictionary.com/browse/install>, 6 pages.

* cited by examiner

OPTIMAL GROUP OF SERVICE COMPOSITIONS

This application is a continuation application claiming priority to Ser. No. 11/427,115, filed Jun. 28, 2006, now U.S. Pat. No. 7,840,431, issued Nov. 23, 2010.

FIELD OF THE INVENTION

The present invention relates generally to providing service components to business processes, and more particularly to determining an optimal group of service compositions for providing service components to business processes.

BACKGROUND OF THE INVENTION

Current methods of providing service components to business processes are not sufficiently cost effective. Thus, there is a need for providing service components to business processes at a lower cost than with current methods of providing service components to business processes.

SUMMARY OF THE INVENTION

The present invention provides a method for forming service compositions to provide service components to business processes, said method comprising:

identifying at least one service component of a plurality of service components independently needed by each business process of a plurality of business processes, wherein at least one of the service components is needed by at least two business processes of the plurality of business processes, and wherein at least two different service components of the plurality of service components are needed by at least one business process of the plurality of business processes;

specifying a plurality of service compositions, wherein each service composition comprises at least one of said service components, and wherein at least one of said service compositions comprises at least two of said service components; and ascertaining an optimal subset of the plurality of service compositions, wherein the total cost of deploying the service compositions in the optimal subset to provide said at least one service component independently needed by each business process does not exceed the total cost of deploying the service compositions in any other subset of the plurality of service compositions to provide said at least one service component independently needed by each business process.

The present invention provides a computer program product, comprising a computer usable medium having a computer readable program code embodied therein, said computer readable program code containing instructions that when executed by a processor of a computer system implement a method for forming service compositions to provide service components to business processes, said method comprising:

identifying at least one service component of a plurality of service components independently needed by each business process of a plurality of business processes, wherein at least one same of the service components is needed by at least two business processes of the plurality of business processes, and wherein at least two different service components of the plurality of service components are needed by at least one business process of the plurality of business processes;

specifying a plurality of service compositions, wherein each service composition comprises at least one of said service components, and wherein at least one of said service compositions comprises at least two of said service components; and ascertaining an optimal subset of the plurality of service compositions, wherein the total cost of deploying the service compositions in the optimal subset to provide said at least one service component independently needed by each business process does not exceed the total cost of deploying the service compositions in any other subset of the plurality of service compositions to provide said at least one service component independently needed by each business process.

The present invention provides a computer system comprising a processor and a computer readable memory unit coupled to the processor, said memory unit containing instructions that when executed by the processor implement a method for forming service compositions to provide service components to business processes, said method comprising:

identifying at least one service component of a plurality of service components independently needed by each business process of a plurality of business processes, wherein at least one of the service components is needed by at least two business processes of the plurality of business processes, and wherein at least two different service components of the plurality of service components are needed by at least one business process of the plurality of business processes;

specifying a plurality of service compositions, wherein each service composition comprises at least one of said service components, and wherein at least one of said service compositions comprises at least two of said service components; and ascertaining an optimal subset of the plurality of service compositions, wherein the total cost of deploying the service compositions in the optimal subset to provide said at least one service component independently needed by each business process does not exceed the total cost of deploying the service compositions in any other subset of the plurality of service compositions to provide said at least one service component independently needed by each business process.

The present invention provides a method of forming service compositions to provide service components of a plurality of service components to business processes of a plurality of business processes via a plurality of service compositions such that each service composition comprises at least one of said service components, said method comprising:

providing a service delivery graph having business process nodes representing the respective business processes, service component nodes representing the respective service components, service composition nodes representing the respective service compositions, service composition edges, and business process edges, wherein each service composition edge connects one of the service composition nodes with one of the service component nodes such that the service composition represented by said one of the service composition nodes comprises the service component represented by said one of the service component nodes, wherein each business process edge connects one of the business process nodes with one of the service composition edges, wherein each contiguous path from a business process node B to a service composition node C (along a business process edge) to a service component node S (along a service composition edge) denotes that the business process represented by B needs the service component represented by S, wherein the service composition edges collectively identify the service compositions, and wherein the contiguous paths collectively identify the service components independently needed by each business process; and executing an algorithm by a processor to ascertain an optimal subset of the plurality of service compositions in the service delivery graph, wherein the optimal subset provides the service components independently needed by each business process in the service delivery graph, and wherein the total cost of deploying the service compositions to provide the service components independently needed by each business process does not exceed the total cost of deploying the service compositions in any other subset of the plurality of service compositions that would provide the service components independently needed by each business process.

The present invention facilitates providing service components to business processes at a lower cost than with current methods of providing service components to business processes.

DETAILED DESCRIPTION OF THE INVENTION

Figure 1:
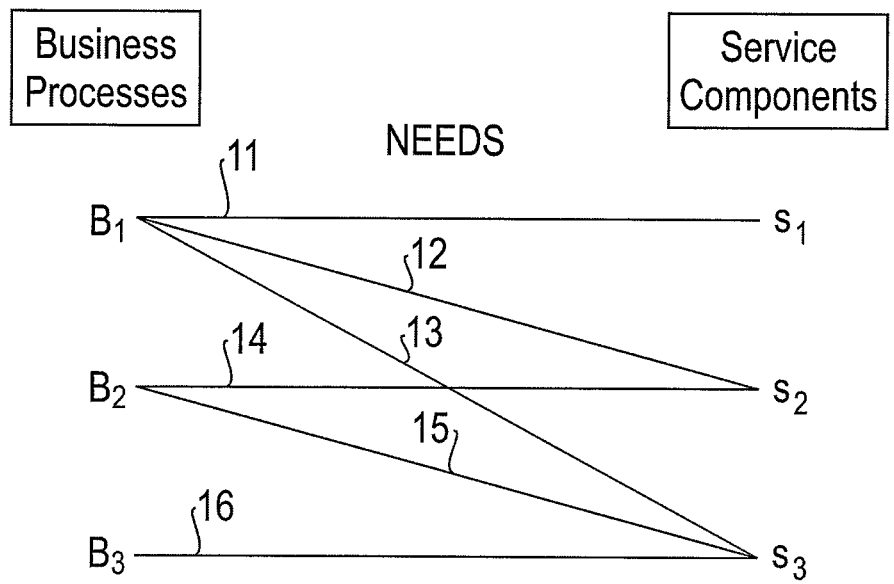
FIG. 1 is a business needs graph depicting three business processes needing three service components, in accordance with embodiments of the present invention.

The detailed description of the present invention is organized into the following sections:
1. Introduction
2. System Model Formulation
3. System Model Solution
4. Description of Method (Implementation Methodology)
5. Formalism
    5.1 Problem Model
    5.2 Greedy Heuristic Approach
6. Computer System 1. Introduction The present invention discloses determination of an optimal group of service compositions for providing service components to business processes at a lower cost than with current methods of providing service components to business processes.

Service Oriented Architectures (SOAs) provide a standard platform where applications and other Information Technology (IT) resources are distributed and seamlessly accessible. Although these applications and resources deliver significant value individually, a greater value can be derived by combining several services from different service providers in accordance with the present invention. The present invention utilizes service compositions for such an environment. A service composition, which is a set of primitive service components, delivers the service components to the consumers integrating the service components to deliver solutions to consumers' business needs, which are typically modeled as business processes. From the consumers' point of view, business process-level modeling allows consumers to reach the higher levels of the value chain established by the service oriented computing and insulate consumers' internal processes from the lower-level technical details of the service implementations.

The present invention provides economic incentives both for the service providers and consumers. The service providers strive to drive the service delivery costs down, to both maximize their thinning profits in today's highly competitive business environment and to be able to convince the potential consumers that the SOA-based service delivery would significantly reduce the IT spending through competitive service rates. The model of the present invention allows sharing the service compositions among the multitude of consumers with minimal or no customization, thereby reducing the integration costs per consumer. Integration costs, such as standard hardware, infrastructure, and system administration, account for a significant portion of the service delivery. The service integration model of the present invention also allows the service providers and consumers to shop for the best mix of service components from an ever growing number of service providers.

In one embodiment of the present invention, the service provider receives the request from the consumers and provides integrated service solutions to satisfy the consumers' business needs. The consumer requests are defined by business processes and the integrated service solutions are created by composing service components that are available from one or different service providers. This model of the present invention defines three main entities in the system: business processes, service components, and service compositions.

A business process is a collection of related, structured activities that produce at least one good, at least one service, or both at least one good and at least one service. In one embodiment, a good and a service each independently fit within the scope of goods and services encompassed by any current or prior edition of the International Classification of Goods and Services for the Purposes of the Registration of Marks. In one embodiment a good is a product, device, computer program, etc. Examples of a business process include accepting a credit card payment from a customer or issuing an insurance policy for a customer.

A business process may be under control or management of an organization such a business entity or a governmental organization. A business entity may comprise a any individual, business, partnership, joint venture, corporation, S-corporation, limited liability corporation, limited liability partnership, sole proprietorship, joint stock company, consortium, non-profit organization, or any other private legal entity recognized by statute.

A service may comprise one or more service components. As an example, the service of providing computer facility on the premises of a customer may comprise the following service components: delivering computer hardware to the premises; delivering computer software to the premises; installing the computer hardware on the premises; and the computer software on the premises. The computer software may comprise an operating system, a relational database management system, a spreadsheet program, graphics software, computer programs pertaining to specific application areas, etc.

A service composition is a set of one or more service components.

Business goals can be defined as the outputs (i.e., at least one good and/or service) of the business processes. Consumers may desire to associate the service components that they are receiving from the service providers with the internal business processes. This association may be defined in terms of delivering the necessary functions in the form of the service components to complete the end-to-end lifecycle of all business processes defined in an organization.

The following example illustrates the preceding three main entities in the system, namely business processes, service components, and service compositions. Assume that there is a service provider company that hosts and offers two different data management services (DataManagement$_1$ and DataManagement$_2$) that are based on two different data management products. Similarly, the service provider company hosts and offers two different middleware solution services (Middleware$_1$ and Middleware$_2$) that are based on two different middleware products. In this case, DataManagement$_1$, DataManagement$_2$, Middleware$_1$, and Middleware$_2$ are the service components in the system. Assume that there are two potential customers for a service provider of the preceding four service components. The first customer needs a data management service and a middleware solution to automate its Customer Relationship Management (CRM) process. The second customer needs specific data management services that can only be delivered by two data management services together that the service provider offers. The second customer also needs a middleware service to automate its Supply Chain Management process. In this case, related structured activities of Customer Relationship Management for the first customer and related structured activities of Supply Chain Management for the second customer are the business processes in the system. To satisfy the requirements of the first customer, the service provider may bundle DataManagement$_1$ and Middleware$_2$ service components and create a service composition, namely Composition$_1$. Similarly, for the second customer, the service provider may create another service composition, Composition$_2$ by bundling DataManagement$_1$, DataManagement$_2$, and Middleware$_1$ service components. Consequently, Composition$_1$ and Composition$_2$ are the service compositions in the system. As the number of service components and the number of business processes increase, there will be an increasing number of possibilities to bundle the service components to create the service compositions that would satisfy business process requirements.

A goal of the present invention is to find the service compositions that satisfy all of the consumer requests while reducing or minimizing the overall cost of service delivery across all of the consumers making such requests. The delivery costs of a service component could be different if the service component is delivered individually or as a part of a particular service composition. For example, packaging a set of service components as a service composition may result in reduced integration costs for the whole package as compared to the sum of the delivery costs of the individual service components. In addition, different service compositions might produce different cost schemes.

In one embodiment, the present invention solves this problem as an optimization problem. This optimization problem is NP-hard as will be shown infra, and an algorithm is presented herein to solve the optimization problem. The algorithm determines a subset of service compositions (from a given set of service compositions) which satisfies a given objective such as minimizing or reducing the cost of providing given service components to given business processes. The existing service compositions could be defined and constrained by many different sources. Some examples are existing product implementations, interoperability issues, and contractual agreements. The methods of the present invention may be applied to any given set of service components and to any given application involving delivery of service components to business processes. Any given set of service compositions may be provided as an input to an algorithm of the present invention.

2. System Model Formulation

This section describes the system model of the present invention through example scenarios.

FIG. 1 is a business needs graph depicting three business processes ($B_1$, $B_2$, $B_3$) needing three service components ($S_1$, $S_2$, $S_3$), in accordance with embodiments of the present invention. Business process $B_1$ needs service components $S_1$, $S_2$, and $S_3$, as denoted by edges 11, 12, and 13, respectively. Business process $B_2$ needs service components $S_2$ and $S_3$, as denoted by edges 14 and 15, respectively. Business process $B_3$ needs service component $S_3$, as denoted by edge 16. The three service components ($S_1$, $S_2$, $S_3$) can be delivered to the three business processes ($B_1$, $B_2$, $B_3$) in accordance with the business needs graph of FIG. 1, either individually or via one or more service compositions such that at least one such service composition comprises at least two service components.

Figure 2:
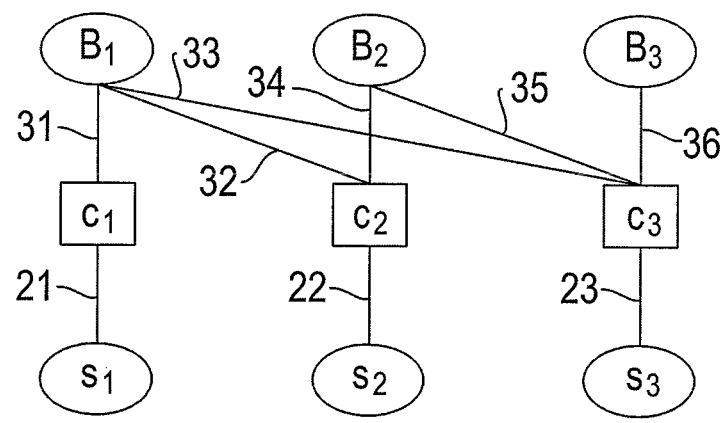
FIG. 2 is a first system model graph depicting three service compositions adapted to deliver the three service components to the three business processes to implement the business needs graph of FIG. 1, in accordance with embodiments of the present invention.

FIG. 2 is a first system model graph depicting three service compositions ($C_1$, $C_2$, $C_3$) adapted to deliver the three service components ($S_1$, $S_2$, $S_3$) to the three business processes ($B_1$, $B_2$, $B_3$) to implement the business needs graph of FIG. 1, in accordance with embodiments of the present invention. Service composition $C_1$ consists of service component $S_1$, as denoted by edge 21. Service composition $C_2$ consists of service component $S_2$, as denoted by edge 22. Service composition $C_3$ consists of service component $S_3$, as denoted by edge 23. The edges 31-36 in FIG. 2 correspond to the edges 11-16, respectively, of FIG. 1 to indicate how the three business processes ($B_1$, $B_2$, $B_3$) are linked to the three service compositions ($C_1$, $C_2$, $C_3$) to fulfill the needs indicated in the business needs graph of FIG. 1. Linkage between a business process B and a service composition C is a symmetric; i.e., if B is linked C, then C is linked to B. FIG. 2 represents an extreme case in which all of the service components ($S_1$, $S_2$, $S_3$) components are delivered individually by the service compositions ($C_1$, $C_2$, $C_3$).

Figure 3:
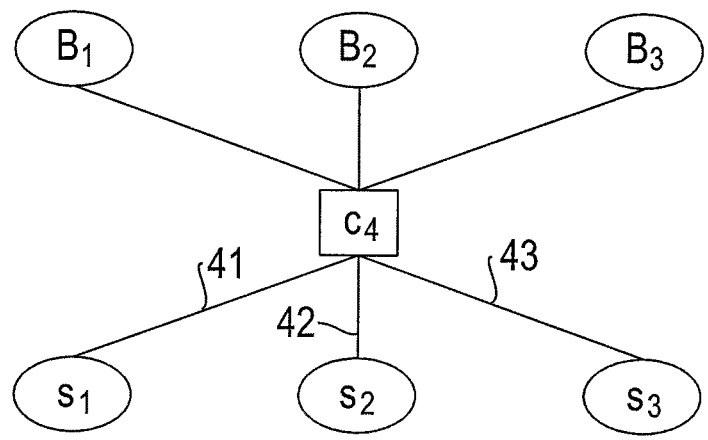
FIG. 3 is a second system model graph depicting one service composition adapted to deliver the three service components to the three business processes to implement the business needs graph of FIG. 1, in accordance with embodiments of the present invention.

FIG. 3 is a second system model graph depicting one service composition ($C_4$) adapted to deliver the three service components ($S_1$, $S_2$, $S_3$) to the three business processes ($B_1$, $B_2$, $B_3$) to implement the business needs graph of FIG. 1, in accordance with embodiments of the present invention. Service composition $C_4$ consists of service component $S_1$, $S_2$, $S_3$, as indicated by edges 41, 42, 43, respectively. FIG. 3 represents an extreme case in which all of the service components ($S_1$, $S_2$, $S_3$) components are delivered together by one service compositions $C_4$. Implementation of the second system model graph of FIG. 3 would not only satisfy the business needs graph of FIG. 1, but would also result in delivery of unneeded service components to business processes. For example, business process $B_3$ would receive needed service component $S_3$ as well as unneeded service components $S_1$ and $S_2$.

Figure 4:
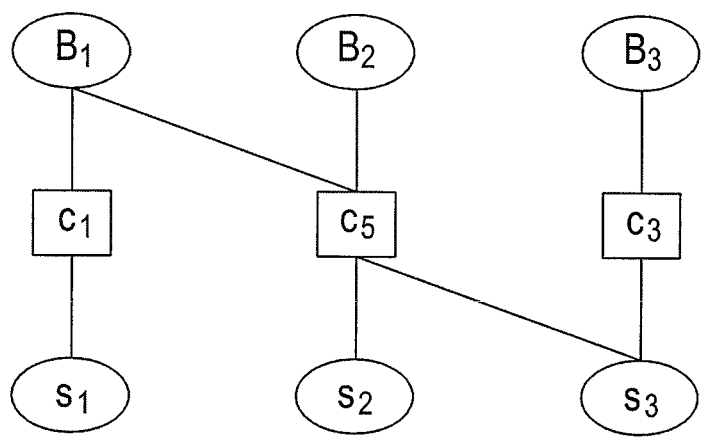
FIG. 4 is a third system model graph depicting three service compositions adapted to deliver the three service components to the three business processes to implement the business needs graph of FIG. 1, in accordance with embodiments of the present invention.

FIG. 4 is a third system model graph depicting three service compositions ($C_1$, $C_5$, $C_3$) adapted to deliver the three service components ($S_1$, $S_2$, $S_3$) to the three business processes ($B_1$, $B_2$, $B_3$) to implement the business needs graph of FIG. 1, in accordance with embodiments of the present invention. Service composition $C_5$ consists of service component $S_2$ and $S_3$. FIG. 4 depicts: service composition $C_1$ adapted to deliver the service component $S_1$ to the business process $B_1$; service composition $C_5$ adapted to deliver the service components $S_2$ and $S_3$ to each of the business processes $B_1$ and $B_2$; and service composition $C_3$ adapted to deliver the service component $S_3$ to the business process $B_3$. In contrast with the second system model graph of FIG. 3, implementation of the third system model graph of FIG. 4 does not permit delivery of unneeded service components to business processes. For example, service composition $C_5$ is unavailable to business process $B_3$, because service composition $C_5$ would deliver both needed service component $S_3$ as well as unneeded service components $S_1$ and $S_2$ to business process $B_3$. In actual practice, there may be reasons why unneeded service components should not be provided to business process. Such reasons may involve consideration of safety, security, confidentiality, etc.

Figure 5:
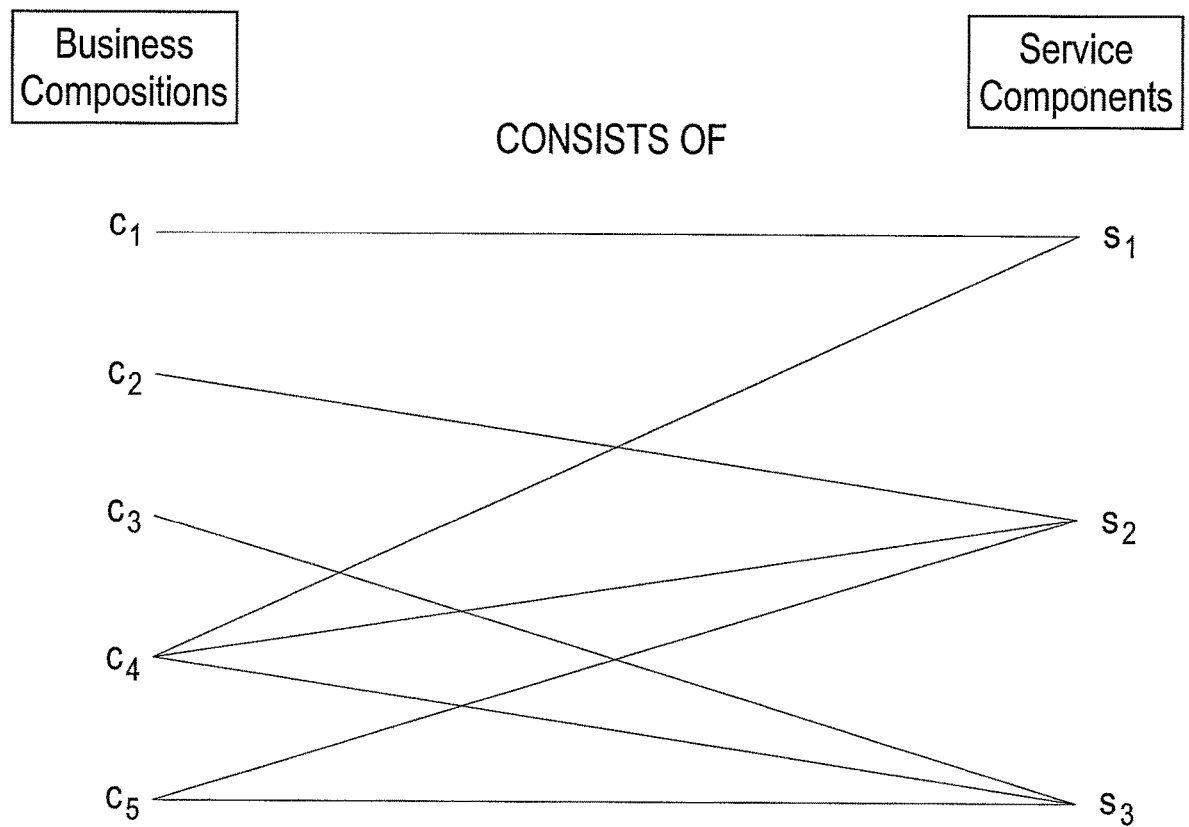
FIG. 5 is a service composition graph defining five service compositions in terms of the three service components, in accordance with embodiments of the present invention.

FIG. 5 is a service composition graph defining five service compositions ($C_1$, $C_2$, $C_3$, $C_4$, $C_5$) in terms of the three service components ($S_1$, $S_2$, $S_3$), in accordance with embodiments of the present invention. In FIG. 5, the service compositions $C_1$, $C_2$, $C_3$, $C_4$ are as indicated in FIGS. 2 and 3, whereas service composition $C_5$ consists of service components $S_2$ and $S_3$ as shown in FIG. 4.

To compute the cost of delivering service component to business processes via service compositions, consider the preceding five service compositions ($C_1$, $C_2$, $C_3$, $C_4$, $C_5$). The cost (Cost) of deploying a service composition to provide the service components therein to a business process is a sum of the individual costs (IndivCost) of the service components plus a composition-specific cost (CompCost) that is specific to the service composition.

Definitionally, an individual cost for a given service component of a composition is specific to the given service component and is composition independent. Thus, the individual cost of the given service component has the same cost value regardless of the particular composition that comprises the given service component. Any service component cost having a value that differs in different service compositions is not an individual cost but rather is a composition-specific cost.

Definitionally, a composition-specific cost is service composition dependent and comprises costs of making the composition available to a customer exclusive of the individual costs. Accordingly in one embodiment, the composition-specific costs of two service compositions are different. Although a composition-specific cost is service composition dependent, however, in one embodiment the composition-specific costs of two service compositions are the same if the numerical value of the composition-specific costs of said two service compositions are the same, even if the composition-specific costs of said two service compositions are due to different cost factors.

As an example, consider a service provider that provides a first prescription drug to a customer (first service component) and also provides a second prescription drug to a customer (second service component). The cost of acquiring the first drug from a drug manufacturer is invariant to the service compositions comprising the first service component and is therefore an individual cost. The cost of acquiring the second drug from a drug manufacturer is invariant to the service compositions comprising the second service component and is likewise an individual cost. However, the cost of shipping the first (or second) drug to the customer is service composition dependent, and therefore is a composition-specific cost, because the cost of shipping the first and second drugs together in one package differs from (e.g., is less than) the cost of shipping the first and second drugs separately. In other words, the shipping cost will differ for a service composition comprising providing the first and second drugs together in comparison with the shipping cost for service compositions in which the first and second drugs are provided separately to a business process.

In this scenario, the individual costs of the three service components ($S_1$, $S_2$, $S_3$) are assumed to be:

$IndivCost(S_1)=2$, $IndivCost(S_2)=5$, $IndivCost(S_3)=6$.

In this scenario, the composition-specific costs of the five service compositions ($C_1$, $C_2$, $C_3$, $C_4$, $C_5$) are assumed to be:

$CompCost(C_1)=1$, $CompCost(C_2)=3$, $CompCost(C_3)=5$, $CompCost(C_4)=11$, $CompCost(C_5)=3$.

Let $Cost(C_i)$=cost of providing a service composition $C_i$ ($i=1, 2, \ldots, 5$) to a business process. Then the values of $Cost(C_i)$, based on the service compositions defined in FIG. 5, are:

$$Cost(C_1) = IndivCost(S_1) + CompCost(C_1) = 2 + 1 = 3,$$

$$Cost(C_2) = IndivCost(S_2) + CompCost(C_2) = 5 + 3 = 8,$$

$$Cost(C_3) = IndivCost(S_3) + CompCost(C_3) = 6 + 5 = 11,$$

$$Cost(C_4) = IndivCost(S_1) + IndivCost(S_2) + IndivCost(S_3) +$$
$$CompCost(C_4)$$
$$= 2 + 5 + 6 + 11 = 24,$$

$$Cost(C_5) = IndivCost(S_2) + IndivCost(S_3) + CompCost(C_5)$$
$$= 5 + 6 + 3 = 14.$$

The preceding costs $Cost(C_i)$ of providing a service composition $C_i$ (i=1, 2, ..., 5) to a business process illustrate an embodiment in which a first service composition ($C_2$) and a second service composition ($C_3$) of the plurality of service compositions ($C_1$, $C_2$, $C_3$, $C_4$, $C_5$) are assumed to be mutually exclusive, wherein a third service composition ($C_5$) of the plurality of service compositions consists of a union of the first service composition ($C_2$) and the second service composition ($C_3$), and wherein the service composition cost $Cost(C_5)$ of the third service composition ($C_5$) with respect to the business process is less than the sum of the service composition cost $Cost(C_2)$ of the first service composition ($C_2$) with respect to the business process and the service composition cost $Cost(C_3)$ of the second service composition ($C_3$) with respect to the business process. In other words, $Cost(C_5)<Cost(C_2)+Cost(C_3)$ since $14<8+11$.

In one embodiment, a first service composition and a second service composition of a plurality of service compositions are mutually exclusive, wherein a third service composition of the plurality of service compositions consists of a union of the first service composition and the second service composition, and wherein the service composition cost of the third service composition with respect to a business process of the plurality of business processes is greater than the sum of the service composition cost of the first service composition with respect to the business process and the service composition cost of the second service composition with respect to the business process. For example, if the first service composition and the second service composition differ only in that the first service composition has a service component providing a food product to a customer and the second service composition has a service component providing a poison product (that kills insects) to a customer, then the third composition (which is a union of the first and second compositions) may have an extra cost of protecting the food product from being contaminated by the poison product, resulting in the third service composition having a higher service composition cost than the sum of the service composition costs of the first and second service compositions.

Using the preceding costs, the following examples illustrate how the cost of providing service components to business processes according to the business needs graph of FIG. 1 varies with use of different service compositions.

Let $CostFor(B_1)$, $CostFor(B_2)$, $CostFor(B_3)$=cost of providing the service components needed by business process $B_1$, $B_2$, $B_3$, respectively.

Let TotalCost=combined cost of providing the service components needed by business process $B_1$, $B_2$, $B_3$; i.e., $$TotalCost=CostFor(B_1)+CostFor(B_2)+CostFor(B_3)$$

In a first example with the first system model graph of FIG. 2, the cost of providing the service components needed business processes $B_1$, $B_2$, $B_3$ are as follows:

$$CostFor(B_1)=Cost(C_1)+Cost(C_2)+Cost(C_3)=3+8+11=22,$$

$$CostFor(B_2)=Cost(C_2)+Cost(C_3)=8+11=19,$$

$$CostFor(B_3)=Cost(C_3)=11$$

$$TotalCost=CostFor(B_1)+CostFor(B_2)+CostFor(B_3)=22+19+11=52.$$

In a second example with the second system model graph of FIG. 3, the cost of providing the service components needed business processes $B_1$, $B_2$, $B_3$ are as follows:

$$CostFor(B_1)=CostFor(B_2)=CostFor(B_3)=Cost(C_4)=24$$

$$TotalCost=CostFor(B_1)+CostFor(B_2)+CostFor(B_3)=24+24+24=72.$$

In a third example with the third system model graph of FIG. 4, the cost of providing the service components needed business processes $B_1$, $B_2$, $B_3$ are as follows:

$$CostFor(B_1)=Cost(C_1)+Cost(C_5)=3+14=17,$$

$$CostFor(B_2)=Cost(C_5)=14,$$

$$CostFor(B_3)=Cost(C_3)=11$$

$$TotalCost=CostFor(B_1)+CostFor(B_2)+CostFor(B_3)=17+14+11=42.$$

With respect to the preceding first, second, and third examples, the second example of the system model of FIG. 3 has the highest TotalCost of 72, because of the added costs of delivering unneeded service components. In particular, service component $S_1$ is delivered to business process $B_2$ even though service component $S_1$ is not needed by business process $B_2$. Similarly, service components $S_1$ and $S_2$ are delivered to business process $B_3$ even though service components $S_1$ and $S_2$ are not needed by business process $B_3$. Note that the third example of the system model of FIG. 4 has the lowest TotalCost of 42.

Figure 6:
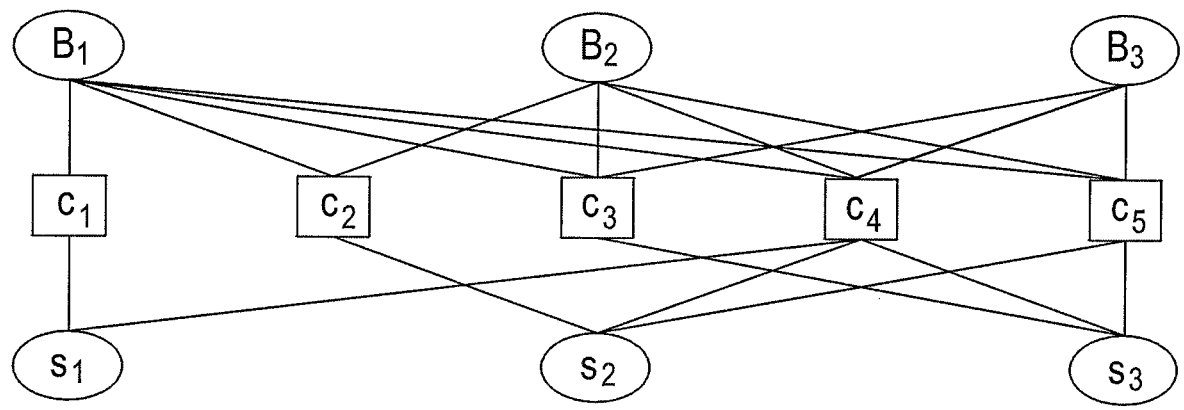
FIG. 6 is a service delivery graph that depicts the combination of the system model graphs of FIGS. 2-4, in accordance with embodiments of the present invention.

FIG. 6 is a service delivery graph that depicts the combination of the system model graphs of FIGS. 2-4, in accordance with embodiments of the present invention. FIG. 6 shows the five service compositions ($C_1$, $C_2$, $C_3$, $C_4$, $C_5$) which may be used in various groupings to provide the service components needed by business processes $B_1$, $B_2$, $B_3$ as described by the business needs graph of FIG. 1.

Various subsets of ($C_1$, $C_2$, $C_3$, $C_4$, $C_5$) each constitute a group of service compositions, each group of service compositions being capable of providing the service components needed by business processes $b_1$, $b_2$, $b_3$. The present invention presents methodology to determine an optimal group of service compositions that minimizes the TotalCost of delivering the service components to the three business processes $B_1$, $B_2$, B according to the business needs graph FIG. 1. The optimal group of service compositions is drawn from the service compositions ($C_1$, $C_2$, $C_3$, $C_4$, $C_5$) of the service delivery graph of FIG. 6 and is therefore an optimal subset of the service compositions ($C_1$, $C_2$, $C_3$, $C_4$, $C_5$). An optimal subset of a given set of service compositions may not be unique, because in a given scenario, more than one subset of the given subset of service compositions may be characterized by a same minimized TotalCost of delivering the needed service components to the given business processes.

For the previously indicated individual costs of the three service components ($S_1$, $S_2$, $S_3$) and composition costs of the five service compositions ($C_1$, $C_2$, $C_3$, $C_4$, $C_5$), it will be shown infra using the methodology of the present invention that the subset {$C_1$, $C_5$, $C_3$} is an optimal subset of the service compositions ($C_1$, $C_2$, $C_3$, $C_4$, $C_5$) which minimizes the TotalCost of delivering the three service components ($S_1$, $S_2$, $S_3$) to the three business processes $B_1$, $B_2$, $B_3$ according to the business needs graph FIG. 1. For the subset {$C_1$, $C_5$, $C_3$}: business process $B_1$ would receive service components $S_1$, $S_2$, $S_3$ from service compositions $C_1$, $C_5$, $C_3$; business process $B_2$ would receive service components $S_2$, $S_3$ from service compositions $C_5$, $C_3$; and business process $B_3$ would receive service component $S_3$ from service composition $C_3$, in fulfillment of the business needs graph of FIG. 1.

The service delivery graph of FIG. 6 may be generated by combining the business needs graph of FIG. 1 with the service composition graph of FIG. 5.

While the service delivery graph of FIG. 6 illustrates an example characterized by three business processes ($B_1$, $B_2$, $B_3$), three service components ($S_1$, $S_2$, $S_3$), and five service compositions ($C_1$, $C_2$, $C_3$, $C_4$, $C_5$), the scope of the present invention is generally characterized by a combination of two or more business processes, two or more business service components, and two or more service compositions. In one embodiment, there are three or more business processes, three or more business service components, and three or more service compositions. In one embodiment, there are four or more business processes, four or more business service components, and four or more service compositions.

Letting $N_B$, $N_S$, and $N_C$ respectively denote the number of business processes, the number of service components, and the number of service compositions, the following triplets of the form ($N_B$, $N_S$, $N_C$) illustrate non-limiting embodiments of the present invention: (2,2,2), (3,2,2), (2,3,2), (2,2,3), (2,3,3), (3,2,3), (3,3,2), (3,3,3), (2,2,4), (2,4,2), (4,2,2), (3,2,4), (3,4,2), (4,3,2), (2,3,2), (2,4,3), (2,3,3), (2,3,4), (4,3,3), (3,4,3), (4,3,2), (3,3,4), (4,4,4), etc. The illustrative service delivery graph of FIG. 6 is characterized by the triplet (3,3,5). Any such triplet satisfying $N_B$, $N_S$, and $N_C$ each having a value of two or more is within the scope of the present invention, subject to the constraint that the maximum value of $N_C$ is the number of unique combinations of service components, which is a function of $N_S$.

In real-world environment, the number of system entities (i.e., business processes and service components) can be extremely large. In addition, the system entities may dynamically change over time and the system has to re-configure the service compositions to constantly keep the costs in check. This motivates the optimization process of the present invention to choose the most beneficial service compositions by considering the system constraints.

Notationally with respect to graphs of FIGS. 1-6, the symbols ($B_1$, $B_2$, $B_3$) denote business process nodes, the symbols ($S_1$, $S_2$, $S_3$) denote service component nodes, the symbols ($C_1$, $C_2$, $C_3$, $C_4$, $C_5$) denote service composition nodes, the edges between the business process nodes and the service composition nodes (e.g., edges 11-16 in FIG. 1 or edges 31-36 in FIG. 2) are business process edges, and the edges between the service composition nodes and the service component nodes (e.g., edges 21-23 in FIG. 2) are service composition edges. Each contiguous path from a business process node B to a service composition node C (along a business process edge) to a service component node S (along a service composition edge) denotes that the business process represented by B needs the service component represented by S. Each service composition edge between a service composition node C and a service component node S is characterized by C comprising S. Thus, the service composition edges collectively identify the service compositions and the contiguous paths collectively identify the service components independently needed by each business process.

3. System Model Solution

This section describes how to determine the optimal service composition subset {$C_1$, $C_5$, $C_3$} that minimizes the TotalCost of delivering the three service components ($S_1$, $S_2$, $S_3$) to the three business processes $B_1$, $B_2$, $B_3$ for the previously indicated individual costs of the three service components ($S_1$, $S_2$, $S_3$) and composition-specific costs of the five service compositions ($C_1$, $C_2$, $C_3$, $C_4$, $C_5$).

First, business process—service component (B-S) pairs are determined from the business needs graph of FIG. 1, wherein a B-S pair is generally defined as a business process (B) paired with a service component (S) regardless of whether B needs S. In one embodiment, all B-S pairs derivable from the totality of business processes and the totality of service components are characterized by B needing S. In one embodiment, at least one B-S pair derivable from the totality of business processes and the totality of service components is characterized by B not needing S. From FIG. 6 or FIG. 1, the B-S pairs such that B needs S are: ($B_1$,$S_1$), ($B_1$,$S_2$), ($B_1$,$S_3$), ($B_2$,$S_2$), ($B_2$,$S_3$), and ($B_3$,$S_3$). From FIG. 6 or FIG. 1, the following B-S pairs are not characterized by B needing S: ($B_2$,$S_1$), ($B_3$,$S_1$), and ($B_3$,$S_2$).

Each of the preceding B-S pairs (such that B needs S) appears in the service delivery graph of FIG. 6 and is said to be "masked" by a service composition that connects the business process and the service component of the B-S pair. Thus, by definition, the only B-S pairs that can be masked by a service composition are those B-S pairs subject to B needing S. A set of service compositions is said to mask a set of B-S pairs if each B-S pair of the set of B-S pairs is masked by at least one service composition of the set of service compositions. In one embodiment pertinent to a given plurality of business processes and a given plurality of service components, a given set of service compositions masks all B-S pairs derivable from the given plurality of business processes and the given plurality of service components. In one embodiment pertinent to a given plurality of business processes and a given plurality of service components, a given set of service compositions does not mask all B-S pairs derivable from the given plurality of business processes and the given plurality of service components.

Figure 7:
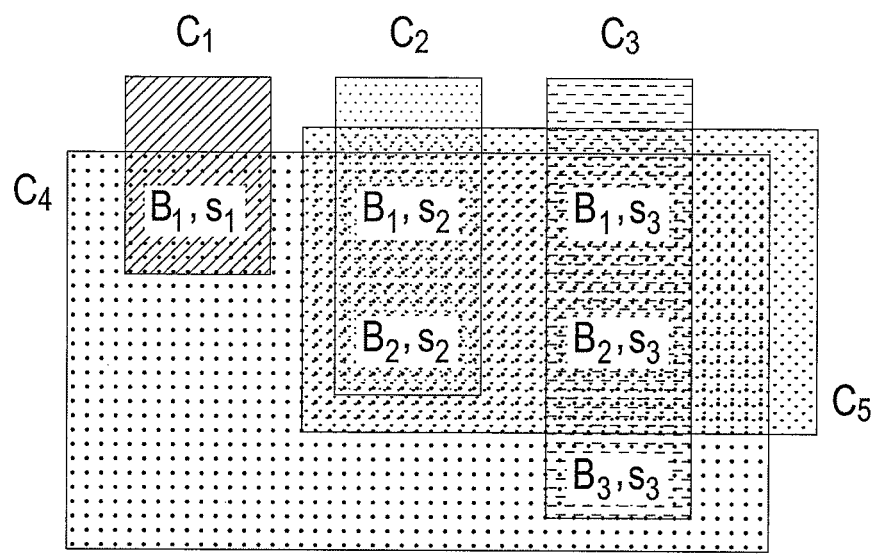
FIGS. 7-9 are mask graphs depicting business process-service component (B-S) pairs for implementing iterations of a greedy heursitic algorithm, in accordance with embodiments of the present invention.

FIG. 7 is a mask graph depicting the (B-S) pairs for implementing the first iteration of a greedy heuristic algorithm, in accordance with embodiments of the present invention. The (B-S) pairs in FIG. 7 are derived from FIG. 6. In FIG. 7, the service composition $C_1$ masks the B-S pair ($B_1$,$S_1$); the service composition $C_2$ masks the B-S pairs ($B_1$,$S_2$), ($B_2$,$S_2$); the service composition $C_3$ masks the B-S pairs ($B_1$,$S_3$), ($B_2$,$S_3$); the service composition $C_4$ masks the B-S pairs ($B_1$,$S_1$), ($B_1$,$S_2$), ($B_1$,$S_3$), ($B_2$,$S_2$), ($B_2$,$S_3$), and ($B_3$,$S_3$); and the service composition $C_5$ masks the B-S pairs ($B_1$,$S_2$), ($B_2$,$S_2$), ($B_1$,$S_3$), and ($B_2$,$S_3$). Thus in FIG. 7, the set of service compositions {$C_1$, $C_2$, $C_3$, $C_4$, $C_5$} masks the set of B-S pairs {($B_1$,$S_1$), ($B_1$,$S_2$), ($B_1$,$S_3$), ($B_2$,$S_2$), ($B_2$,$S_3$), ($B_3$,$S_3$)}. As seen in FIG. 7, however, the set of service compositions {$C_1$, $C_2$, $C_3$, $C_4$, $C_5$} does not mask all B-S pairs derivable from the set of business processes ($B_1$, $B_2$, $B_3$) and the set of service components {$S_1$, $S_2$, $S_3$}, because the B-S pairs ($B_2$,$S_1$), ($B_3$,$S_1$), and ($B_3$,$S_2$) are not masked by the set of service compositions {$C_1$, $C_2$, $C_3$, $C_4$, $C_5$}.

The greedy heuristic algorithm iteratively determines an optimal subset of the service compositions ($C_1$, $C_2$, $C_3$, $C_4$, $C_5$), with this optimal subset minimizing the TotalCost of delivering the three service components ($S_1$, $S_2$, $S_3$) to the three business processes $B_1$, $B_2$, $B_3$. In particular, the algorithm determines a best service composition of the optimal subset in each iteration until the optimal subset has been generated. At the end of each iteration, the best service composition determined in each iteration and the B-S pairs masked by the determined best service composition are removed from the mask graph. The best service composition in each iteration is a service composition in the mask graph having the highest benefit/cost ratio.

Let $R_i$=benefit/cost ratio of service composition $C_i$, i=1, 2, ..., I (I=number of service compositions).

$$=NP_i/(NB_i*Cost(C_i))$$

wherein $NP_i$=number of B-S pairs masked by $C_i$ ($NP_1$=1, $NP_2$=2, $NP_3$=3, $NP_4$=6, $NP_5$=4)

$Cost(C_i)$=cost of providing a service composition $C_i$ to one business process $NB_i$=number of business processes to which the service composition $C_i$ is provided ($NB_1$=1, $NB_2$=2, $NB_3$=3, $NB_4$=3, $NB_5$=2).

Although the preceding formula involving ($NB_i$*Cost($C_i$)) for the benefit/cost ratio ($R_i$) assumes that the cost ($C_i$) of providing the service composition $C_i$ is the same for each business process to which the service composition $C_i$ is provided, the cost ($C_i$) may differ for different business processes to which the service composition $C_i$ is provided. For example, providing an electrical product designed to operate at 110 volts to a customer in the United Kingdom may have an added cost of providing for conversion from 220 volts (which is standard in electrical outlets in the United Kingdom) to 110 volts, whereas such voltage conversion would be unnecessary for providing the same electrical product to a customer in the United States because 110 volts is standard in electrical outlets in the United States. In one embodiment, different values of the cost $Cost(C_i)$ of the service composition $C_i$, with respect to the different business components, are due to a difference in composition costs with respect to the different business components.

If the cost $Cost(C_i)$ differs for different business processes to which the service composition $C_i$ is provided, then ($NB_i$*Cost($C_i$)) in the preceding formula for the benefit/cost ratio ($R_i$) should be replaced by $\Sigma_n$ Cost($C_{in}$), wherein Cost($C_{in}$)=cost of providing a service composition $C_i$ to business process $B_n$, wherein $\Sigma_n$ denotes a summation over n from n=1 to n=$N_i$, and wherein $N_i$ denotes the number of business processes to which service composition $C_i$ is provided.

From FIG. 7 and the previously computed values of $Cost(C_1)$=3, $Cost(C_2)$=8, $Cost(C_1)$=11, $Cost(C_1)$=24, $Cost(C_1)$=14, the values of $R_i$ for the first iteration are:

$$R_1=1/(1*3)=1/3=0.333$$

$$R_2=2/(2*8)=2/16=0.125$$

$$R_3=3/(3*11)=3/33=0.091$$

$$R_4=6/(3*24)=6/72=0.083$$

$$R_5=4/(2*14)=4/28=0.143$$

Thus, the highest benefit/cost ratio in the first iteration is $R_1$=0.333. Therefore service composition $C_1$ is the best service composition of ($C_1$, $C_2$, $C_3$, $C_4$, $C_5$) in the first iteration. Noting that service composition $C_1$, masks the B-S pair ($B_1$,$S_1$), the algorithm removes the service composition $C_1$ and the B-S pair ($B_1$,$S_1$) from the mask graph of FIG. 7 to generate the mask graph of FIG. 8 for the second iteration. The B-S pair ($B_1$,$S_1$) is "covered" by the service composition $C_1$ via the step of removing the B-S pair ($B_1$,$S_1$) and the service composition $C_1$ from the mask graph.

Figure 8:
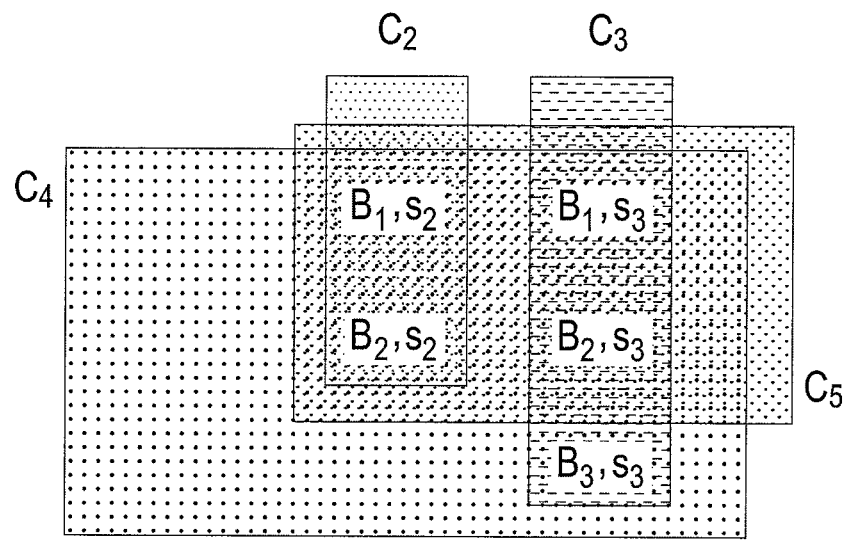

FIG. 8 is a mask graph depicting the (B-S) pairs for implementing the second iteration of the greedy heuristic algorithm, in accordance with embodiments of the present invention. As a result of removing the service composition $C_1$ and the B-S pair ($B_1$,$S_1$) at the end of iteration 1, the values of $NP_i$ in iteration 2 may differ from the values of $NP_i$ in iteration 1. For iteration 2: $NP_2$=2, $NP_3$=3, $NP_4$=5, $NP_5$=4. The values of $R_i$ for the second iteration are:

$$R_2=2/(2*8)=2/16=0.125$$

$$R_3=3/(3*11)=3/33=0.091$$

$$R_4=5/(3*24)=5/72=0.060$$

$$R_5=4/(2*14)=4/28=0.143$$

Thus, the highest benefit/cost ratio in the second iteration is $R_5$=0.143. Therefore service composition $C_5$ is the best service composition of ($C_2$, $C_3$, $C_4$, $C_5$) in the second iteration. Noting that service composition $C_5$ masks the B-S pairs ($B_1$,$S_2$), ($B_2$,$S_2$), ($B_1$,$S_3$), and ($B_2$,$S_3$), the algorithm removes the service composition $C_5$ and the B-S pairs ($B_1$,$S_2$), ($B_2$,$S_2$), ($B_1$,$S_3$), and ($B_2$,$S_3$) from the mask graph of FIG. 8 to generate the mask graph of FIG. 9 for the third iteration. The B-S pairs ($B_1$,$S_2$), ($B_2$,$S_2$), ($B_1$,$S_3$), and ($B_2$,$S_3$) are "covered" by the service composition $C_5$ via the step of removing the B-S pairs ($B_1$,$S_2$), ($B_2$,$S_2$), ($B_1$,$S_3$), and ($B_2$,$S_3$) and the service composition $C_5$ from the mask graph.

Figure 9:
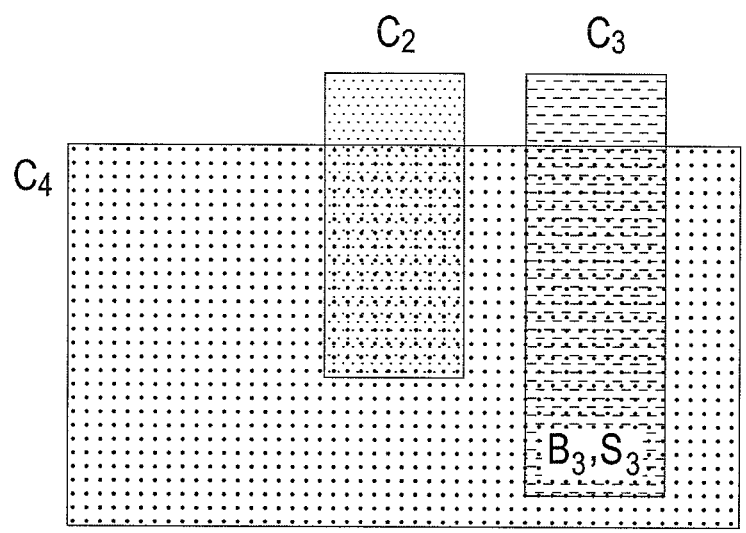

FIG. 9 is a mask graph depicting the (B-S) pairs for implementing the third iteration of the greedy heuristic algorithm, in accordance with embodiments of the present invention. Although the service composition $C_2$ is shown in FIG. 9, the benefit/cost ratio $R_3$ is not computed in the third iteration because the service composition $C_2$ does not mask any B-S pairs. For iteration 3: $NP_3$=1, $NP_4$=1. The values of $R_i$ for the third iteration are:

$$R_3=1/(3*11)=1/33=0.033$$

$$R_4=1/(3*24)=1/72=0.013$$

Thus, the highest benefit/cost ratio in the second iteration is $R_3$=0.033. Therefore service composition $C_3$ is the best service composition of ($C_2$, $C_3$, $C_4$) in the third iteration. Noting that service composition $C_3$ masks the B-S pair ($B_3$,$S_3$), the algorithm removes the service composition $C_3$ and the B-S pair ($B_3$,$S_3$) from the mask graph of FIG. 9, leaving the set of B-S pairs as an empty set of B-S pairs, which terminates the algorithm. The B-S pair ($B_3$,$S_3$) is "covered" by the service composition $C_3$ via the step of removing the B-S pair ($B_3$,$S_3$) and the service composition $C_3$ from the mask graph.

Thus the optimal service composition subset is $\{C_1, C_5, C_3\}$ in the preceding example. The optimal service composition subset is $\{C_1, C_5, C_3\}$ collectively covers the six C-S pairs of ($B_1$,$S_1$), ($B_1$,$S_2$), ($B_1$,$S_3$), ($B_2$,$S_2$), ($B_2$,$S_3$), and ($B_3$,$S_3$).

In the preceding example, calculations are performed on the total cost of delivering each service composition. The calculations are not performed on individual costs and composition-specific costs of the service compositions in isolation. Accordingly, the preceding example in which the total cost of delivering each service composition was divided into individual costs and a composition-specific cost is one embodiment of the present invention. Generally, any method of defining and tracking various cost components of the total cost of delivering each service composition is within the scope of the present invention.

4. Description of Method

Figure 10:
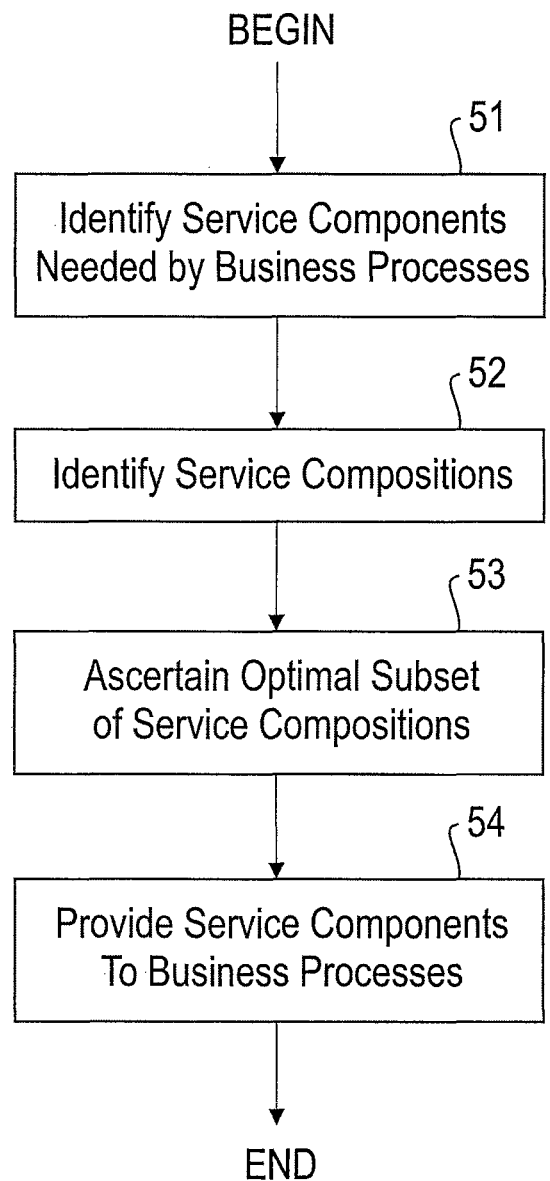
FIGS. 10-11 are flow charts describing a method of ascertaining an optimal group of service compositions for providing service components to business processes, in accordance with embodiments of the present invention.
Figure 11:
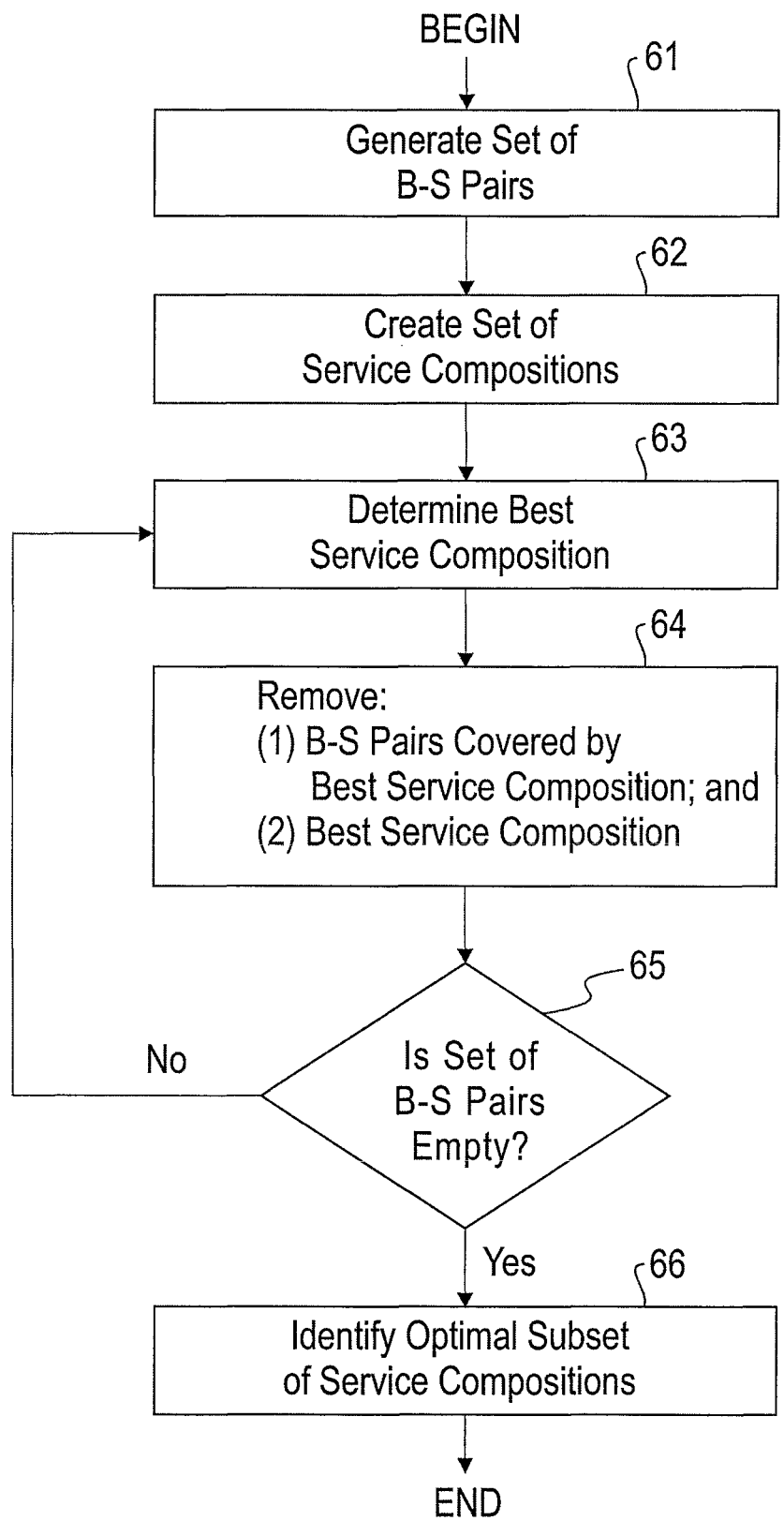

FIGS. 10-11 are flow charts describing a method of ascertaining an optimal group of service compositions for providing service components to business processes, in accordance with embodiments of the present invention. The flow charts in FIGS. 10-11 reflect the system model formulation and solution described supra in Sections 2 and 3, respectively. FIG. 10 provides a high-level description and FIG. 11 describes in more detail how the optimal group of service compositions is ascertained.

The flow chart of FIG. 10 comprises steps 51-54.

Step 51 of FIG. 10 identifies at least one service component of a plurality of service components independently needed by each business process of a plurality of business processes. At least one same service component of the plurality of service components is needed by at least two business processes of the plurality of business processes. At least two different service components of the plurality of service components are needed by at least one business process of the plurality of business processes. For example, see the business needs graph of FIG. 1 described supra.

In one embodiment, the plurality of business processes is under control or management of a single business entity.

In one embodiment, the plurality of business processes is under control or management of a plurality of business entities.

In one embodiment, a single service comprises the plurality of service components.

In one embodiment, a plurality of services comprise the plurality of service components.

In one embodiment, the identified at least one service component independently needed by each business process is characterized by at least one service component not being needed by at least one business process. In FIG. 1, for example, service component $S_1$ is not needed by business process $B_3$.

In one embodiment, the identified at least one service component independently needed by each business process is characterized by each service component being needed by each business process. In this embodiment, each business process is connected by an edge to each service component in the business needs graph.

Step 52 identifies a plurality of service compositions. Each service composition comprises at least one of the service components identified in step 51. At least one of the service compositions comprises at least two of the service components. For example, see the service composition graph of FIG. 5 described supra. See also the service delivery graph of FIG. 6, described supra, in which the service compositions of the service composition graph FIG. 5 are made available to business processes in compatibility with the business needs graph of FIG. 1.

Step 53 ascertains an optimal subset of the plurality of service compositions identified in step 52, wherein the total cost of deploying the service compositions in the optimal subset (to provide the at least one service component independently needed by each business process) does not exceed the total cost of deploying the service compositions in any other subset of the plurality of service compositions (to provide the at least one service component independently needed by each business process).

Step 54 provides the needed service components to the business processes as identified in step 51 via the optimal subset of service compositions ascertained in step 53. In one embodiment, the needed service components are provided to the business processes by a single service provider. In one embodiment, the needed service components are provided to the business processes by a plurality of service providers.

The flow chart of FIG. 11 comprises steps 61-67.

Step 61 generates, from the identified at least one service component independently needed by each business process, a set of B-S pairs initially consisting of all B-S pairs in which a business process is paired with a service component independently needed by the business process. The B-S pairs may be generated from a business needs graph. For example, the B-S pairs $(B_1,S_1)$, $(B_1,S_2)$, $(B_1,S_3)$, $(B_2,S_2)$, $(B_2,S_3)$, and $(B_3,S_3)$ were derived from the business needs graph of FIG. 1. Each B-S pair appears in the service delivery graph (see FIG. 6) and is "masked" by at least one service composition that connects the business process and the service component of the B-S pair.

Step 62 creates a set of service compositions comprising service compositions linked to the plurality of business processes. The set of service compositions masks the set of B-S pairs generated in step 61.

After the set of service compositions are initially created in step 62, step 63 determines a best service composition of the set of service compositions such that the best service composition has a benefit/cost ratio no less than the benefit/cost ratio of all other service compositions of the set of service compositions. The benefit/cost ratio of a service composition is defined as the ratio of the number of B-S pairs masked by the service composition to the cost of deploying the service composition to provide the service components in the service composition to all of the business processes in the B-S pairs masked by the service composition. As explained supra, the calculation formula for the cost of deploying a given service composition to provide the service components in the given service composition to all of the business processes in the B-S pairs masked by the given service composition depends on whether the cost of providing the given service composition is or is not the same cost for each business component to which the given service composition is provided. The best service composition may not be unique, because more than one service composition may have a same benefit/cost ratio that is no less than the benefit/cost ratio of all other service compositions of the set of service compositions. If more than one best service composition exists, then step 63 may select one of said best service compositions by any method (e.g., random selection).

Step 64 removes: (1) the B-S pairs masked by the best service composition determined in step 63 from the set of B-S pairs; and (2) the best service composition determined in step 63 from the set of service compositions. Removal of the best service composition and the B-S pairs masked by the best service composition in step 64 results in the B-S pairs masked by the best service composition being "covered" by the best service composition.

Step 65 determines whether the set of B-S pairs is empty.

If step 65 determines that the set of B-S pairs is not empty, then the algorithm loops back to step 63 to iteratively perform steps 63 and step 64 until step 65 determines that the set of B-S pairs is empty.

If step 65 determines that the set of B-S pairs is empty, then step 66 identifies the optimal subset of the plurality of service compositions as consisting of the best service compositions removed in step 64.

5. Formalism

This section present a more formal description of the methodology and algorithms of the present invention.

5.1 Problem Model

In this sub-section, the Optimal Service Composition Selection (OSCS) problem is formally presented. As explained supra, the present invention determines the "best" service compositions from the candidate service compositions while minimizing the overall cost to the consumers through maximizing the benefit/cost ratio of the service compositions, resulting in selection of the most "beneficial" service compositions from the candidate service compositions while minimizing the overall cost to the consumers.

The benefit of a service composition is defined as the ability of the service composition to satisfy the service needs of the business processes and is equivalent to the benefit/cost ratio of the service composition. This ability is represented by the connections between the business processes and the service components as illustrated in the business needs graph of FIG. 1. The system model comprises three main entities: service components, service compositions, and business processes (e.g., as defined by the consumers).

The Optimal Service Composition Selection (OSCS) problem is modeled by using a service delivery (e.g., FIG. 6). In a service delivery graph of the form G=(V, E), there are three types of nodes (vertices), S, C, B for service components, (candidate) service compositions, and business processes, respectively. Thus, V=S∪C∪B.

There is an edge between a service component node s∈S and a service composition node c∈C if s is included in c. There is an edge between a service composition node c∈C and a business process node b∈B if c is used by b; i.e., if business component b uses the part or all of the services provided by c to satisfy the consumer needs. There are no edges between the service component nodes and the business process nodes, but the service component nodes and the business process nodes are connected through service composition nodes. Thus, E={(u, v)| either (u∈S and v∈C) or (u∈C and v∈B)}.

Definition 1. (Connected Pair) sb: s∈S, b∈B is called a connected pair ↔ ∃c such that (s, c)∈E and (c, b)∈E. The pair sb is called a Connected Pair, because c connects s and b which is denoted as c ⤳ sb. P is defined as the set of all connected pairs in the graph. The system has to satisfy the consumer needs. Therefore, all of the business processes should be connected to the necessary services through the service compositions. In the model, this means, there should be at least one sb connected pair for each b∈B.

Definition 2. (Service Composition Cost) A cost c' is defined for each service composition node c. The cost c' has two terms, 1) a component-specific cost p (denoted in Section 2 as CompCost) that includes the system specific cost elements for the service composition, such as integration cost, delivery cost, etc., to deliver the service composition to one business process, and 2) the sum of the individual costs $s''_i$ (denoted in Section 2 as IndivCost) of the service components that the corresponding service composition is comprised of. Formally, $c'=p+\Sigma s''_i$, where $s''_i$ is the integration cost for $s_i \in S$ and $\forall (s_i, c) \in E$.

Definition 3. (Measure) A measure M(·) is defined for a graph G=(V,E) as M(S,C,B)=Σc' which is the sum of the service composition costs, where c' is the service composition cost for c∈C.

Definition 4. (Optimal Service Composition Selection (OSCS) Problem)

The Optimal Service Composition Selection Problem id defined as for a given service delivery graph G=(V,E), find a subset C'⊆C, such that M(S,C',B) is minimum over all possible C'⊆C.

Next, a definition for the Weighted Set-Covering problem is provided to prove the NP-hardness of OSCS problem.

Definition 5. (Weighted Set-Covering Problem) An instance (U,P) of Weighted Set-Covering problem is defined as follows: A finite set of points U, a collection P={$Q_1$, $Q_2$, ..., $Q_n$} of subsets of U, and positive numbers, i.e., costs, $t_1$, $t_2$, ..., $t_n$ associated with $Q_i$. The cost of a collection is $\Sigma_{Q_i \in P} t_i$. A cover for U is a subset P'⊆P such that every element in U belongs to at least one member of P'. The problem is to find a cover of minimum cost.

The Weighted Minimum Set Cover problem is known to be NP-hard, as disclosed in V. Chvatal, "A Greedy Heuristic for the Set-Covering Problem", *Mathematics of Operations Research*, 4(3):233-235, 1979.

Theorem 1. Optimal Service Composition Selection (OSCS) problem is NP-hard.

Theorem 1 is proved by a reduction from the Weighted Set-Covering problem. Given an instance of (UP) Weighted Set-Covering problem, the instance is mapped to the specific instance of (G) OSCS. The mapping is defined as follows:

For each $Q_i \in P$, create a corresponding service composition node $c_i \in C$.

Let set B={$b_1$} as a singleton set. For each point $e_j \in U$ create a service component node $s_j \in S$.

Create an edge from $s_j$ to $c_i$ if $e_j \in Q_i$.

Create and edge from $c_i$ to $b_1$.

This reduction can be done in polynomial time. For specific instance of (G), a set of service component nodes C' that minimizes M(S,C',B) exists if and only if there exists a cover P' for U that is a cover of minimum cost.

←: Assume P'={$Q_1$, ..., $Q_m$} is a cover with the minimum cost c' for U. Since service composition nodes $c_i$ has been chosen to correspond to {$Q_1$, ..., $Q_m$}, each of these $c_i$ has an edge to at least one service component node $s_j$ that corresponds to $e_j$, which is included in $\cup_{Q_i \in P} Q_i$. As $\cup_{Q_i \in P} Q_i$ is a cover for U with the minimum cost, it corresponds to the set of services {$c_1, c_2, ..., c_m$} that minimizes M(S,C',B).

→: Assume there is a set of service components C'={$c_1$, $c_2$, ..., $c_m$} with the minimum cost for G. Then, $c_i \in C'$ correspond to subsets $Q_i$ of U. Each $c_i$ has an edge to at least one service component node $s_j$ and each $s_j$ has a corresponding node $e_j \in U$. As C'={$c_1$, $c_2$, ..., $c_m$} generates the minimum cost, {$Q_1$, ..., $Q_m$} is a cover P' of minimum cost for U.

The preceding analysis has proved that the OSCS problem is NP-hard. Next, Section 5.2 presents a solution to the OSCS problem. The solution is an approximation algorithm with a provable ratio bound.

5.2 Greedy Heuristic Approach

This sub-section presents an approximation algorithm, with a ratio bound, to the weighted set-covering problem. This will provide a basis for implementation of a greedy algorithm to solve the OSCS problem. The approximation algorithm for the weighted set-covering problem is shown in Table 1.

TABLE 1

Algorithm: GREEDY-WEIGHTED-SET-COVER

Input: A collection P of sets $Q_1$, $Q_2$, ..., $Q_n$ s.t.
U = $\cup_{Q_i \in P} Q_i$ and associated costs $c_1, c_2, ..., c_n$
Output: The cover P' of minimum cost
1   U' ← U
2   P' ← Φ
3   while U' ≠ Φ
4   do select an $Q_i \in P$ that maximizes |$Q_i \cap U'$|/$c_i$
5   U' ← U' − $Q_i$
6   P' ← P' ∪ {$Q_i$}
7   endwhile
8   return P'

The set U' contains the set of uncovered points at each stage of the algorithm. The set P' holds the cover that is being constructed. In Line 4, a subset $Q_i$ that maximizes the ratio |$Q_i \cap U'$|/$c_i$ is selected, breaking ties arbitrarily. The ratio counts the number of points covered by $Q_i$ per unit cost.

After a $Q_i$ is chosen, its elements are removed from U' and $Q_i$ is added to P'. When the algorithm terminates, P' is the cover of minimum cost.

Running time for the algorithm is polynomial. The time complexity of a possible implementation is O(|U||P|min(|U|, |P|)). In terms of approximation performance, the algorithm has a ratio bound as it is given below.

Theorem 2. GREEDY-WEIGHTED-SET-COVER algorithm has a ratio bound of: $|P'| \leq |P^*| \cdot H(\max\{|Q_i||Q_i \in P\}) \leq 1 + \ln|U|$, where $|P^*|$ is the cost of an optimal cover $P^*$ and $|P'|$ is the cost of the cover P' returned by the greedy heuristic algorithm. H (·) is a Harmonic number and nth Harmonic number is $\Sigma^n_{k=1}(1/k) = \ln n + O(1)$.

The proof for Theorem 2 can be found in V. Chvatal, "A Greedy Heuristic for the Set-Covering Problem", *Mathematics of Operations Research*, 4(3):233-235, 1979.

Based on the greedy heuristic, a greedy algorithm, which works on our graph model, has been implemented in accordance with pseudo code for the algorithm given in

TABLE 2

Algorithm: SERVICE-COMPOSITION-SELECT

Input: C: set of candidate service compositions,
associated with service composition costs c',
S: set of service components, B: set of business processes,
SB: set of all connected pairs sb
Output: C': set of selected service compositions
Precomputation: Construct a matrix SC = $(f_{ij})$: $1 \leq i \leq |S|, 1 \leq j \leq |C|$
 such that $f_{ij}$ = 1 if service component $s_i \in S$ is included in
 service composition $c_j \in C, f_{ij}$ = 0 otherwise
Computation:
1  C' ← Φ, SB ← Φ
2  while SB" ≠ Φ do
3   C" ← C − C',SB" ← SB − SB'
4    for all c ∈ C' let benefit(c) = 0
5    for all b ∈ B do
6     for all c ∈ C" do
7      if c is included in b do
8       for all s ∈ S do
9        if f = 1,f element of SC corresponding to s and c
10        and no previous connection between b and c then
11         benefit(c) ← benefit(c) + 1
12     endfor, endfor, endfor
13    select $c_{select} \in C"$ maximizing the ratio benefit (c)/cost (c)
14    C' = C' U $\{c_{select}\}$, SB' = SB' U $\{sb_i | c_{select} \leadsto sb_i\}$
15  endwhile
16  return C'

The algorithm of Table 2 is consistent with the flow charts of FIGS. 10-11 described supra, and avoids expensive multiple passes over data and stores summary information for efficiency. An adjacency matrix, SC, among the service component and the service composition nodes is constructed in the precomputation step. This matrix is utilized to avoid repeated comparisons to test the inclusion of a service component in a particular service composition in the loop starting at Line 8.

In each iteration, the benefits of the service composition nodes c in candidate service compositions set C" are computed and the service composition that maximizes the ratio benefit/cost is added to the selected service composition set C'(Line-14). Benefit for a service composition is computed as the number ($N_P$) of previously uncovered connections (i.e., previously masked connections in the mask graph), which are through the service composition node, between the service component nodes and the business process nodes. Selected service compositions are removed from the candidate service compositions set in Line 3. The algorithm also keeps updating the set of connected pairs SB of service components and business processes. When a service composition node is selected, all of the connected pairs that are created by that service composition node are also removed from the graph (Line 3). This is required as the benefit of a service composition node is the number of connections that are made through the service composition node. Consequently, the benefit of each service composition node is changed over the iterations. The algorithm terminates when all of the connected pairs sb between the business processes and the service components are covered by the service compositions of the optimal group of service compositions. This solves the problem of assigning service components needed by "all" of the business processes.

6. Computer System

Figure 12:
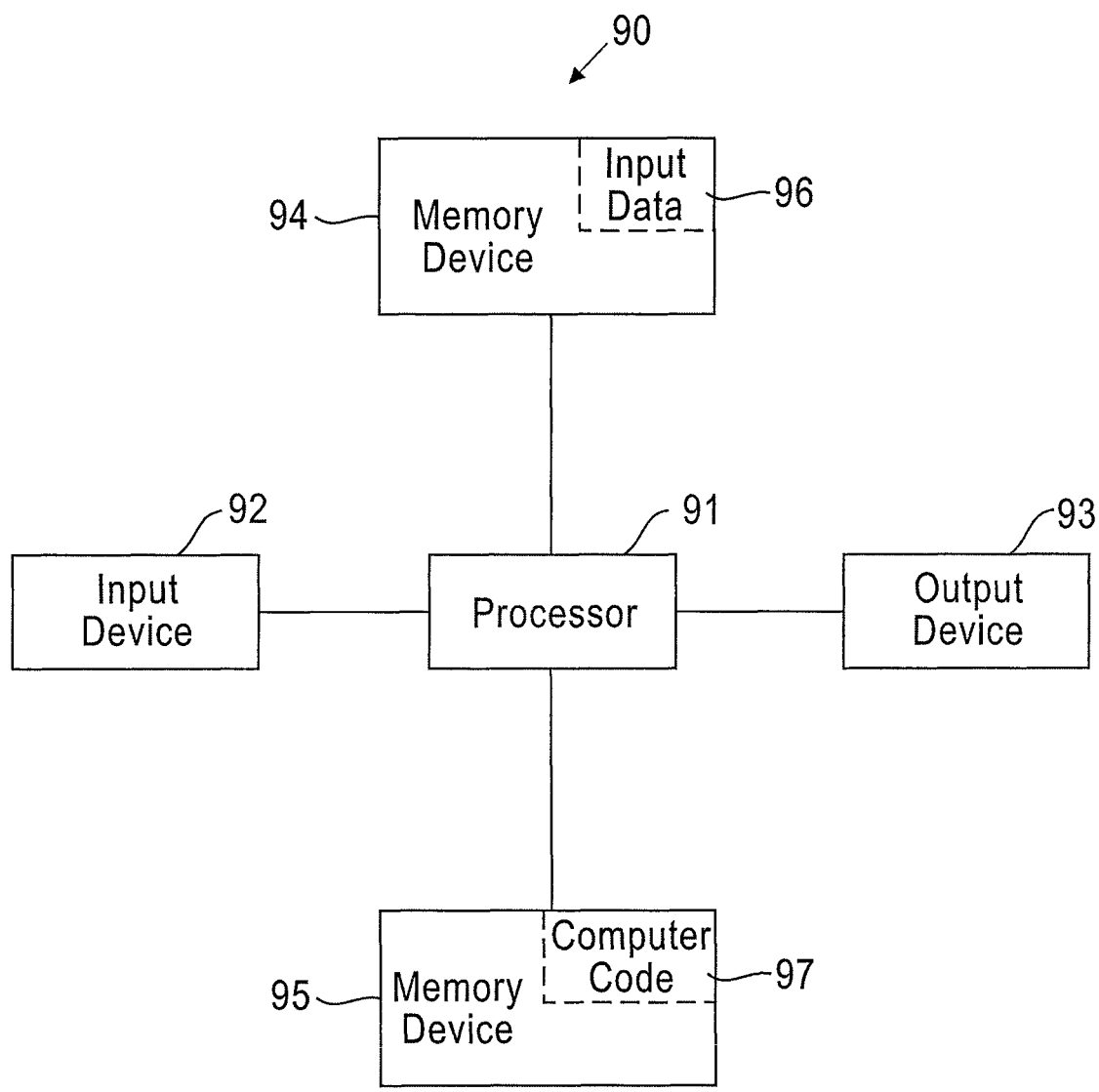
FIG. 12 illustrates a computer system used for implementing a method of ascertaining an optimal group of service compositions for providing service components to business processes, in accordance with embodiments of the present invention.

FIG. 12 illustrates a computer system used for implementing a method of ascertaining an optimal group of service compositions for providing service components to business processes, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for implementing a method of ascertaining an optimal group of service compositions for providing service components to business processes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 12) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, said method comprising:
implementing, by a processor of a computer system, a first process of a plurality of processes, said implementing the first process comprising implementing a first service of installing computer software on a computer facility of a premises;

wherein at least two different service components of $N_s$ service components are independently needed by the first process to implement the first service of installing the computer software, wherein the at least two different service components are at least two different software programs, wherein one or more service components of the $N_s$ service components are not needed and not used by the first process to implement the first service of installing the computer software, and wherein $N_s$ is at least 2;

wherein the first service of installing the computer software uses a subset of $N_c$ service compositions to implement the first service of installing the computer software, and wherein $N_c$ is at least 2;

wherein at least one service composition of the subset of the $N_c$ service compositions comprises the at least two different service components needed to implement the first service of installing the computer software, and wherein the first service uses the at least two different service components to implement the first service of installing the computer software by installing the at least two different software programs on the computer facility;

wherein the $N_s$ service components, including the at least two service components therein, are dynamically changing over time, wherein a system constraint is that a maximum value of $N_c$ is required to be a number of unique combinations of the $N_s$ dynamically changing service components, and wherein the subset of the $N_c$ service compositions, including the at least one service composition therein, satisfies the system constraint.

2. A computer program product, comprising a computer readable storage device having a computer readable program code embodied therein, said computer readable storage device not being a transitory signal, said computer readable program code containing instructions that when executed by a processor of a computer system implement a method, said method comprising:

implementing, by the processor of the computer system, a first process of a plurality of processes, said implementing the first process comprising implementing a first service of installing computer software on a computer facility of a premises;

wherein at least two different service components of $N_s$ service components are independently needed by the first process to implement the first service of installing the computer software, wherein the at least two different service components are at least two different software programs, wherein one or more service components of the $N_s$ service components are not needed and not used by the first process to implement the first service of installing the computer software, and wherein $N_s$ is at least 2;

wherein the first service of installing the computer software uses a subset of $N_c$ service compositions to implement the first service of installing the computer software, and wherein $N_c$ is at least 2;

wherein at least one service composition of the subset of the $N_c$ service compositions comprises the at least two different service components needed to implement the first service of installing the computer software, and wherein the first service uses the at least two different service components to implement the first service of installing the computer software by installing the at least two different software programs on the computer facility;

wherein the $N_s$ service components, including the at least two service components therein, are dynamically changing over time, wherein a system constraint is that a maximum value of $N_c$ is required to be a number of unique combinations of the $N_s$ dynamically changing service components, and wherein the subset of the $N_c$ service compositions, including the at least one service composition therein, satisfies the system constraint.

3. A computer system comprising a processor and a computer readable memory device coupled to the processor, said memory device containing instructions that when executed by the processor implement a method, said method comprising:

implementing, by the processor of the computer system, a first process of a plurality of processes, said implementing the first process comprising implementing a first service of installing computer software on a computer facility of a premises;

wherein at least two different service components of $N_s$ service components are independently needed by the first process to implement the first service of installing the computer software, wherein the at least two different service components are at least two different software programs, wherein one or more service components of the $N_s$ service components are not needed and not used by the first process to implement the first service of installing the computer software, and wherein $N_s$ is at least 2;

wherein the first service of installing the computer software uses a subset of $N_c$ service compositions to implement the first service of installing the computer software, and wherein $N_c$ is at least 2;

wherein at least one service composition of the subset of the $N_c$ service compositions comprises the at least two different service components needed to implement the first service of installing the computer software, and wherein the first service uses the at least two different service components to implement the first service of installing the computer software by installing the at least two different software programs on the computer facility;

wherein the $N_s$ service components, including the at least two service components therein, are dynamically changing over time, wherein a system constraint is that a maximum value of $N_c$ is required to be a number of unique combinations of the $N_s$ dynamically changing service components, and wherein the subset of the $N_c$ service compositions, including the at least one service composition therein, satisfies the system constraint.

\* \* \* \* \*